United States Patent [19]

Harwood et al.

[11] Patent Number: 5,042,125
[45] Date of Patent: Aug. 27, 1991

[54] APPARATUS FOR MANUFACTURING STAMP FORMED MUFFLERS

[75] Inventors: Jon W. Harwood, Toledo, Ohio; Wayne A. Karlgaard, Dyersburg, Tenn.; Michael W. Clegg, Toledo, Ohio

[73] Assignee: AP Parts Manufacturing Company, Del.

[21] Appl. No.: 528,566

[22] Filed: May 24, 1990

Related U.S. Application Data

[62] Division of Ser. No. 335,120, Apr. 7, 1989, Pat. No. 4,928,732.

[51] Int. Cl.⁵ .............................. B23P 21/00
[52] U.S. Cl. .................. 29/33 K; 29/564.2; 29/783; 29/788; 29/796; 228/49.1
[58] Field of Search .............. 29/169.5, 783, 787, 29/788, 791, 795, 796, 890.08, 33 K, 564, 564.2; 228/47, 49.1

[56] References Cited

U.S. PATENT DOCUMENTS 3,479,725 11/1969 Shaff et al. .................. 29/890.08 X
3,536,887 10/1970 Herbst et al. ................ 228/49.1 X
3,646,657 3/1972 Small ............................ 29/890.08 X
3,991,927 11/1976 Napor et al. ................. 228/49.1 X
4,589,184 5/1986 Asano et al. .
4,700,806 10/1987 Harwood .
4,863,092 9/1989 Nguyen .......................... 228/47

Primary Examiner—Mark Rosenbaum
Assistant Examiner—Frances Chin
Attorney, Agent, or Firm—Anthony J. Casella; Gerald E. Hespos

[57] ABSTRACT

Apparatus and process are provided for assembling an exhaust system which includes a stamp formed muffler and pipes connected thereto. The muffler is assembled on an indexable fixturing apparatus having a plurality of stations for receiving the formed components of the muffler. Robotic gripping apparatus are provided in proximity to the indexable fixturing apparatus for moving aligned components of the muffler to welders for securely connecting the aligned components to one another. Simultaneously the pipes for the exhaust system are bent into their required configuration by programmable pipe benders. The assembled muffler and the bent pipes are then delivered to a second indexable fixturing apparatus. The loosely assembled components of the exhaust system are indexed into proximity to programmable welders which securely connect the exhaust system components together. The completed exhaust system is indexed into a position for unloading and subsequent shipment.

14 Claims, 1 Drawing Sheet

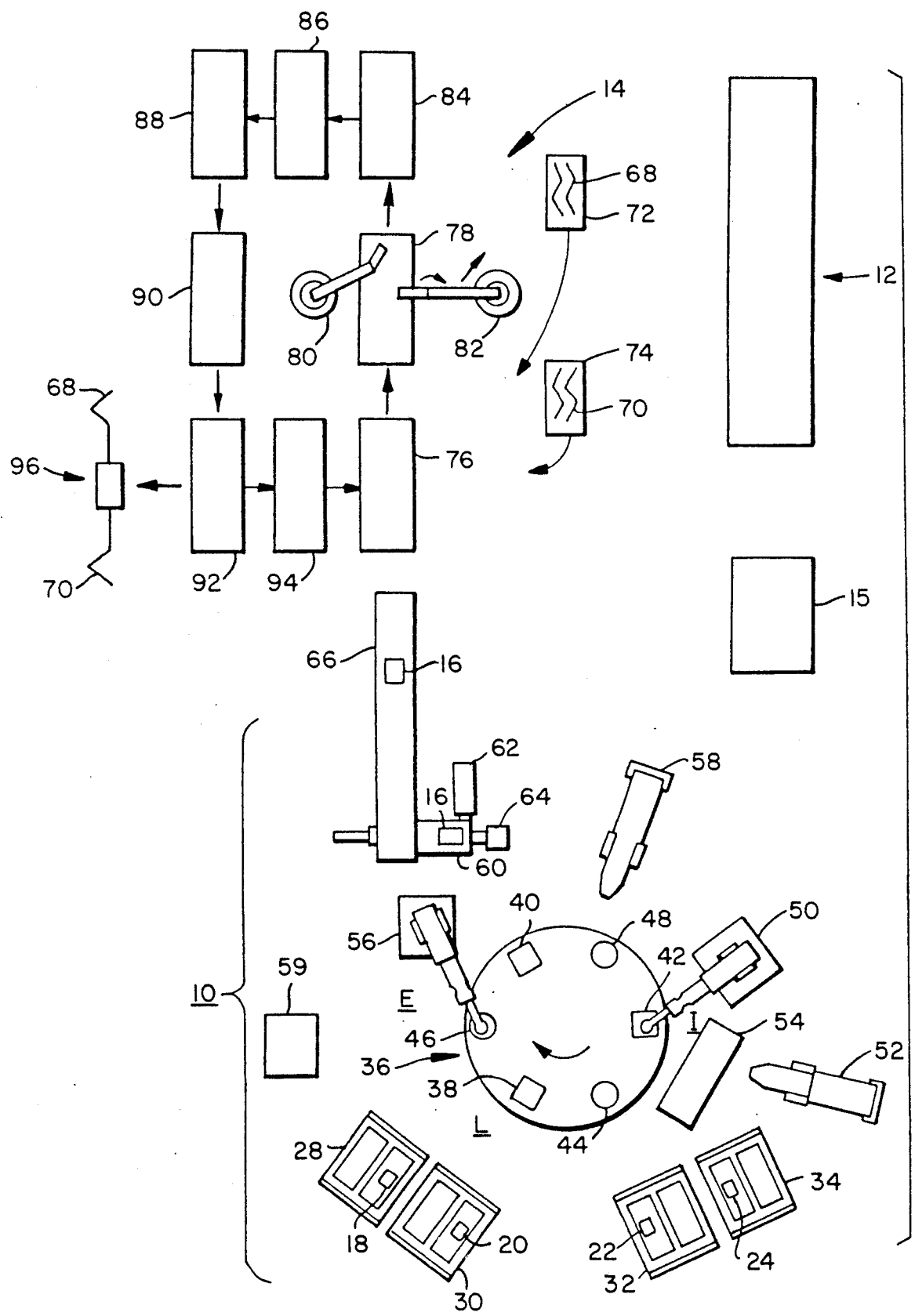

APPARATUS FOR MANUFACTURING STAMP FORMED MUFFLERS

This application is a divisional application of Ser. No. 335,120, filed 4/7/89 now U.S. Pat. No. 49287

BACKGROUND OF THE INVENTION

The typical prior art exhaust muffler comprises a plurality of short linear tubes which are formed with arrays of perforations, louvers, apertures or the like. The tubes of the prior art muffler are supported in a generally parallel array by a plurality of transversely extending baffles. Each baffle typically will be oval or circular and will include apertures extending therethrough for receiving and supporting the tubes of the prior art muffler. The tubes and baffles typically are mounted manually relative to one another, with the baffles being disposed at predetermined spacings along the length of the respective tubes. The particular manual assembly procedure can vary significantly. In a typical process each tube will be securely connected to at least one baffle to define tube/baffle subassemblies.

The manufacture and assembly of the prior art muffler proceeds by forming a sheet of metal into a tubular configuration with a circular or oval cross section corresponding to the shape of the baffles and with a length substantially defining the length of the muffler. The subassemblies of parallel tubes and transverse baffles then are slid sequentially into the tubular outer shell, with each baffle being spot welded to the tubular shell. A second sheet of metal then is wrapped around the tubular outer shell in generally face-to-face relationship therewith. The outer wrapper is provided on the prior art muffler to dampen or eliminate shell ring. The prior art muffler is completed by mounting opposed end caps to opposed ends of the prior art muffler. The end caps each typically are provided with an aperture for defining the respective inlet and outlet of the muffler. Mufflers intended for original equipment applications typically will have a long circuitous exhaust pipe and a long circuitous tail pipe mounted respectively to the inlet and outlet. The connection of the exhaust pipe and tail pipe to the muffler typically is carried out by manually mounting the muffler and the pipes in a complex fixture and subsequently welding the pipes to the opposed ends of the muffler. Mounting brackets or hangers may also be welded to the muffler or pipes at this time.

The above described manufacturing process for the typical prior art muffler is extremely labor intensive and slow. Furthermore, the process inherently requires a substantial amount of floor space both for carrying out the many manufacturing process steps and for storing the inventory of the numerous components incorporated into the apparatus.

The prior art also includes mufflers that are formed at least in part from stamped components. The use of stamp formed components provides at least the potential for reducing the number of parts in the muffler. Some stamp formed exhaust mufflers merely consist of a pair of opposed mateable shells which are stamp formed to define a circuitous array of tubes and chambers. The movement of the exhaust gas through the circuitous array is intended to attenuate the noise associated with the flow of exhaust gas. One muffler of this general type is shown in U.S. Pat. No. 3,638,756 which issued to Thiele on Feb. 1, 1972. The two shells of the muffler shown in U.S. Pat. No. 3,638,756 are provided with mateable peripheral flanges. The flanges may be provided with complementary arrays of nestable embossments which define areas at which the opposed external shells are brazed.

Another prior art stamp formed muffler is shown in U.S. Pat. No. 4,132,286 which issued to Hasui et al. on Jan. 2, 1979. The muffler shown in U.S. Pat. No. 4,132,286 includes a pair of opposed stamp formed external shells, each of which includes a peripheral flange. The external shells shown in U.S. Pat. No. 4,132,286 each are formed to define a single outwardly extending chamber. The muffler of U.S. Pat. No. 4,132,286 further includes stamp formed internal guide pieces each of which is substantially smaller than the corresponding external shell and each of which is provided with its own peripheral flange. The muffler of U.S. Pat. No. 4,132,286 is assembled by first spot welding the internal guides to the inner surfaces of the respective external shells. The opposed external shells with the respective guides mounted thereto are then secured to one another by seam welding about the respective peripheral flanges of the external shells.

Still another prior art stamp formed muffler is shown in British Pat. Specification No. 632,013 which is directed to a muffler having a pair of stamp formed internal plates and a pair of stamp formed external shells. The internal plates and the external shells each comprise peripheral flanges extending thereabout. The internal plates of British Pat. No 632,013 are further formed to define arrays of perforated tubes therein. The muffler of British Pat. No. 632,013 is assembled by initially spot welding the internal plates to one another at their respective peripheral flanges. The peripherally spot welded internal plates are then disposed intermediate the external shells, and the external shells are securely welded to one another about their peripheral flanges.

The principal function of exhaust mufflers is to attenuate the exhaust related noise. This noise attenuation function is carried out by the particular arrangement of perforated tubes in the muffler and by the respective volumes of the chambers surrounding the tubes. As noted above, the movement of exhaust gas through the muffler also tends to create vibration of the muffler shells, with a corresponding shell noise generated by these vibrations. The prior art conventional mufflers avoided shell noise by providing a separate outer wrapper around the outer shell of the muffler. The prior art stamp formed mufflers identified above have no adequately dealt with the noises associated with shell ring.

In addition to attenuating noise, mufflers must be able to withstand the rigorous use to which they are subjected. For example, the smooth flow of exhaust gases can be altered significantly by an improperly tuned engine. In extreme instances, a badly tuned engine will create backfires where the combustion takes place external to the engine and within a portion of the exhaust system. The explosive forces associated with backfires can severely damage or destroy an exhaust muffler. As a result, some new car manufacturers in the United States require original equipment exhaust mufflers to withstand a backfire test. In particular, the exhaust muffler must maintain its structural integrity even after exposure to repeated backfires. Backfire specifications were complied with in the prior art conventional mufflers by welding the internal baffles to the outer shell at a plurality of locations around the outer shell. The prior art stamp formed mufflers generally were employed on European cars which often did not adequately address the backfire requirements associated with most new car manufacturers in the United States. Many prior art stamp formed mufflers included separated internal baffles which could be securely welded to the external shell as in the prior art conventional mufflers described above.

Several recent improvements have been made in connection with stamp formed mufflers. One such improvement is shown in U.S. Pat. No. 4,700,806 which issued to Jon Harwood on Oct. 20, 1987, and which is assigned to the Assignee of the subject invention. The muffler shown in U.S. Pat. No. 4,700,806 is able to provide a noise attenuation performance equal to or better than conventional mufflers with separate pipes and tubular outer shells. Other significant improvements relating to stamped mufflers are shown in U.S. Pat. No. 4,736,817 which issued to Jon Harwood on Apr. 12, 1988; U.S. Pat. No. 4,759,423 which issued to Jon Harwood et al. on July 26, 1988; U.S. Pat. No. 4,760,894 which issued to Jon Harwood et al. on Aug. 2, 1988; and, U.S. Pat. No. 4,765,437 which issued to Jon Harwood et al. on Aug. 23, 1988. Each of these patents to Harwood or Harwood et al. are primarily related to structural and operational improvements in the muffler. Improvements relating to the manufacture of the stamped components for incorporation into a stamped muffler are shown in copending U.S. patent application Ser. No. 259,176 which was filed by Jon W. Harwood et al. on Oct. 18, 1988. The disclosures of the various Harwood or Harwood et al. patents and pending applications are incorporated herein by reference.

The disclosures of the above referenced patents and pending applications which are assigned to the Assignee of the subject invention are directed primarily to structural and functional improvements in the muffler, and to an efficient method for stamp forming the components of the muffler. It is an object of the subject invention to provide an efficient method and apparatus for assembling the components of the muffler.

It is another object of the subject invention to provide an efficient method for assembling the mufflers that will ensure adequate structural strength for the mufflers.

It is an additional object of the subject invention to provide a process and apparatus which enables the assembly of stamp formed mufflers within a very small area.

A further object of the subject invention is to provide a process for simultaneously carrying out a plurality of manufacturing process steps on a plurality of different stamped mufflers.

SUMMARY OF THE INVENTION

The subject invention is directed to a process for manufacturing a stamp formed muffler. The muffler may comprise a pair of internal plates which have been formed to define arrays of channels therein. The channels are disposed on the internal plates to define an array of tubes when the plates are disposed in face-to-face relationship. The muffler further comprises at least one and preferably a pair of external shells which are formed to define a plurality of chambers therein. The external shells may include a crease extending thereacross to define a baffle which separates chambers. The external shells are configured to be placed around the internal plates and generally in register with one another to define the muffler.

The process of the subject invention may comprise a first step of providing the appropriately formed plates and shells for incorporation into the muffler. In particular, a plurality of separate supplies may be provided, with each supply comprising a plurality of the required plates and shells for the muffler. The plates and shells for the muffler may be formed at separate locations and appropriately delivered to an assembly facility. Alternatively, the manufacturing assembly apparatus and process described herein may be an extension of a stamping operation performed at a single location or at adjacent locations.

The process of the subject invention may further comprise the step of presenting the formed internal plates to means for connecting the internal plates to one another. In particular, the connecting means may be operative to securely connect the internal plates at plurality of locations thereacross, including locations spaced inwardly from the peripheral edges of the internal plates. The connection may be carried out at locations on opposed sides of the formed channels in each internal plate such that the channels are securely connected to one another for efficiently permitting the flow of exhaust gas therethrough and for preventing damage from backfire or thermal distortion. The internal plates may also be securely connected to one another in proximity to apertures formed through one or both internal plates to permit the flow of exhaust gases therefrom. The connection of the internal plates to one another may be carried out by welding, such as spot welding at a plurality of locations across the assembled internal plates, or by other connecting methods, such as mechanical connection means.

The step of assembling the internal plates may efficiently be carried out by presenting the internal plates to an indexable fixturing apparatus. In particular, a first internal plate may be loosely mounted to a fixture on the indexable fixturing apparatus. A second internal plate may then be loosely positioned in the same fixturing apparatus and in opposed generally face-to-face relationship with the first internal plate. The indexable fixturing apparatus may then be operative to advance the loosely assembled internal plates to a second indexed position. The loosely assembled internal plates at the second indexed position may then be presented to an appropriate attachment apparatus, such as a spot welder. The presentation of the assembled internal plates to the spot welder or other such connection apparatus may be by a robotic gripping apparatus which securely grips the loosely assembled internal plates, temporarily retains the internal plates in their proper assembled and aligned condition and moves the aligned internal plates to a spot welding apparatus for permanently securing the internal plates to one another at locations thereabout that will ensure adequate strength and performance for the internal plates in the muffler. The robotic apparatus may then return the spot welded internal plates to the indexable fixturing apparatus.

The apparatus and process may further advance the securely connected internal plates to a third index location where the internal plates may be properly positioned in proximity to the external shells of the muffler. In particular, a first external shell may be loosely placed in another indexable fixture. The internal plates may then be loosely positioned within the first external shell. A second external shell may then be loosely positioned over the first external shell and the securely connected internal plates to loosely enclose the internal plates. The indexable fixturing apparatus may then be indexed again to present the loosely assembled components of the muffler to a second connecting apparatus. In particular, the loosely assembled components of the muffler may be indexed to a location from which they may be advanced to a spot welder for spot welding the external shells and internal plates to one another at a plurality of locations thereon. The spot welding may, for example, be carried out at the creases between the formed chambers of the external shells, such that portions of the baffle creases of each external shell are securely connected to the internal plates. The secure connection of the baffle creases to the internal plates substantially contributes to backfire resistance and substantially prevents vibration between the external and internal components of the muffler, thereby avoiding shell ring.

The discrete spaced apart connections of the external shells and internal plates to one another and/or to the internal plates ensures secure alignment of the muffler components to on another. The muffler is then advanced to means for securely connecting the external shells and internal plates to one another about peripheral portions thereof. In particular, the assembled components of the muffler may be advanced to an x-y indexing table disposed in proximity to a seam welding apparatus. The x-y indexing table may be operative to sequentially move the assembled muffler relative to the seam welder, such that the peripheral portions of the internal plates and external shells are securely welded to one another substantially entirely about the periphery thereof.

Seam welding four thicknesses of metal material about the periphery of the stamp formed muffler can be difficult, particularly for coated metals, such as aluminized steel or galvanized steel. Attempts to complete such welds have yielded unacceptable gaps that could propagate into larger defects once the muffler is installed in the high pressure high vibration environment of an automobile.

Extensive analysis and investigation of test welds has shown that the seam welding deficiencies are caused substantially by nonabutment of adjacent peripheral portions of the muffler prior to welding. In particular, metallurgical differences from one sheet of metal to the next may cause sheets of metal to respond differently to the metal forming operations that are employed to create the chambers and tubes of the muffler. Thus, in at least certain locations, the peripheral flanges may not be in direct abutting face-to-face contact with one another prior to welding. The forces exerted by the welding wheels or disks often will be sufficient to urge the four formed sheets of metal into direct abutting face-to-face contact to achieve an acceptable weld. However, in many instances, even forces of 500 pounds to 1,000 pounds exerted by the welding wheels or disks will not be adequate to urge all four thicknesses of metal into direct abutting face-to-face contact. Furthermore, it is generally undesirable to require welding equipment to exert forces of this magnitude.

To solve these problems and thereby reliably produce acceptable seam welds, the apparatus of the subject invention may comprise means such as a restriking stamp apparatus for urging the metal into direct abutting contact. The restriking stamp apparatus may be employed in the process by restriking the registered peripheral portions prior to performing the seam welding. The restriking may be carried out after the spot welding but before the seam welding or alternatively prior to both the spot welding and seam welding. The restriking is effective to ensure that the peripheral portions of all sheets of metal to be welded are in direct abutting face-to-face contact upon presentation to the seam welder. The restriking may also enable the seam welder to exert much lower forces against the peripheral portions while reliably producing high quality welds.

The indexable fixturing means for assembly of the muffler may comprise a carousel having a plurality of fixtures thereon. The carousel may be indexable to a plurality of different positions relative to the supplies of internal plates and external shells and relative to robotic grippers and welding apparatus. The entire process of placing the muffler components into the fixtures on the carousel can be automated. However, it is preferred that an inspector be available to identify any apparent malfunctions. Accordingly, the inspector may further perform the tasks of loading the internal plates and external shells into the fixtures on the carousel from adjacent supplies of such internal plates and external shells.

The process may further comprise the step of advancing the completed muffler to a second indexable fixturing apparatus for receiving the muffler and the pipes connectable thereto. In particular, the muffler, the pipes and any related mounting hardware may be loosely but accurately positioned in a fixture that is indexable through a plurality of locations. Once the respective exhaust system components are properly placed in the fixture, the fixture is indexed to at least one welding location at which a plurality of welding operations may be carried out by automated welding apparatus such as one or more robotic welders. The welders may be operative to securely connect the pipes to the muffler, securely connect mounting hardware to the muffler and/or to the pipes and to complete certain welds on the muffler to enhance rigidity and backfire resistance. Depending upon the number and complexity of the welds, a plurality of indexed welding stations may be provided. The completely assembled exhaust system is then further indexed to a station from which the assembly may be removed for final shipment.

BRIEF DESCRIPTION OF THE DRAWING The FIGURE is a schematic view of the apparatus for assembling an exhaust system in accordance with the subject

DETAILED DESCRIPTION OF THE PREFERRED EMBODIMENTS

The manufacturing cell for carrying out the process of the subject invention is illustrated schematically in the FIGURE. The manufacturing cell comprises a muffler assembly station 10, a tube bending station 12 and a system assembly station 14.

The muffler assembly station 10 illustrated in the FIGURE is controlled by a control unit 15 and is operative to produce exhaust mufflers 16 from four separate stamped members. In particular, each muffler 16 will comprise first and second formed internal plates 18 and 20 respectively and first and second formed external shells 22 and 24 respectively. The manufacturing facilities for forming the internal plates 18 and 20 and the external shells 22 and 24 are not depicted in the FIGURE. A preferred method and apparatus for forming the internal plates 18 and 20 and the external shells 22 and 24 is described in copending patent application Ser.

No. 259,176, the disclosure of which is incorporated herein by reference. As explained in the copending application Ser. No. 259,176, the internal plates 18 and 20 are formed to define arrays of channels such that the channels define arrays of tubes when the internal plates 18 and 20 are placed in face-to-face relationship with one another. Selected channels are provided with perforations, louvers, apertures or the like to permit an expansion of the exhaust gases from the tubes defined by the channels. The external shells 22 and 24 are formed to define chambers which will surround selected portions of the tubes defined by the internal plates 18 and 20.

The formed internal plates 18 and 20 and the formed external shells 22 and 24 are delivered from stamping or other such forming facilities (not shown) to a component loading position L of the muffler assembly station 10 at which respective storage locations 28-34 are disposed. The storage locations 28-34 may define movable bins which are disposed in proximity to an indexable fixturing carousel 36. The carousel 36 comprises fixtures 38, 40 and 42 for receiving internal plates 18 and 20 and fixtures 44, 46 and 48 for receiving external shells 22 and 24 as explained herein. The internal plate fixtures 38-42 are disposed substantially about the periphery of the indexable fixturing carousel 36 and are spaced from one another by approximately 120°. The external shell fixtures 44-48 also are disposed about the periphery of the carousel 36 and are spaced from one another by approximately 120°. However, the external shell fixtures 44-48 are disposed intermediate adjacent internal plate fixtures 38-42. The carousel 36 is operative to rotatably index at 120° intervals. As depicted in the FIGURE, the carousel 36 rotatably indexes in a clockwise direction.

A first robotic gripping apparatus 50 is disposed approximately 240° about the carousel 36 in a clockwise direction from the loading position L to define an internals assembly position I. The internals assembly position I further comprises a spot welder 52 and a conveyor 54. The robotic gripper 50 is operative to securely grip a pair of loosely assembled but properly aligned internal plates 18 and 20 from an internal plate fixture 38-42, and to deliver an aligned pair of internal plates 18 and 20 to the spot welder 52. Grippers on the robotic device will be configured to ensure accurate alignment of the plates 18 and 20. The robotic device 50 moves the internal plates 18 and 20 relative to the spot welder 52 to enable a plurality of preselected spaced apart locations to be welded. The locations on the internal plates 18 and 20 for the spot welds are selected to define a plurality of locations on opposed sides of the formed tubes to provide adequate backfire resistance and to ensure that plates 18 and 20 will be retained in substantially vibration free contact to one another. The robotic device 50 is then operative to place the securely connected internal plates 18 and 20 on the conveyor 54 for transportation back to the loading position L.

The worker at the loading position L who also loads the internal plates 18 and 20 (or alternatively an appropriate robotic apparatus in place of a worker) will load a first formed external shell 22 into the external shell fixture 44 at the loading position L. The assembled internal plates 18 and 20 delivered by the conveyor 54 are then placed in the first external shell 22, and a second external shell 24 is placed in the fixture 44 to be in register with the first external shell 22. The carousel 36 next is indexed 120° such that the assembled components that had been placed in the fixture 44 will be at the external assembly position E, and generally at the location depicted by fixture 48 in the FIGURE.

A robotic gripping device 56 is located at the external assembly position E, and is operative to securely grip the portions of the assembled external shells 22 and 24 with the internal plates 18 and 20 therein. More particularly, the robotic device 56 is operative to move the securely engaged muffler components 18-24 to a spot welder 58 which is operative to spot weld the components 18-24 to one another at a plurality of preselected locations. The selected locations will comprise locations within the baffle crease formed in the external shells 22 and 24 and in the vicinity of the inlet and outlet to the muffler 16 and other selected locations around the perimeter of the muffler 16. The spot welding is operative to securely hold the muffler 16 components in proper alignment to one another and to contribute to the backfire resistance of the muffler 16. The robotic device 56 is then operative to move the interconnected components 18-24 of the muffler 16 to a restrike stamping apparatus 59 having opposed dies substantially corresponding to the configuration of the generally registered peripheral portions of the interconnected components 18-24. The restriking apparatus preferably is operable to strike the peripheral portions with a force of at least approximately 50 tons and preferably about 150 tons. This restriking force is effective to ensure that the peripheral portions of all four components 18-24 are in direct abutting face-to-face contact with one another. In certain embodiments, the muffler components 18-24 may be fixtured in an aligned relationship and presented to the restriking apparatus 59 prior to the spot welding. In these embodiments, the properly aligned muffler components may then be presented to the spot welder after the restriking.

The robotic device 56 then is operative to move the interconnected components 18-24 of the muffler 16 to an x-y indexing table 60. The indexing table 60 is in proximity to a seam welder 62, and is operative to securely hold the muffler 16 and rotate the muffler 16 through a selected array of x-y coordinates relative to the seam welder 62. The seam welder 62 is operative to create a plurality of substantially adjacent weld nuggets which approximate a continuous seam in the portions of the muffler 16 presented to it by the x-y indexing table 60. The movement of the indexing table 60, therefore, is carefully controlled to present the seam welder 62 with the peripheral flanges of the muffler 16 such that a continuous seam is welded about the peripheral flanges of the muffler 16. A pusher means 64 is provided to push the completely welded muffler 16 onto a conveyer 66 which transports the fully assembled muffler 16 to a system assembly station 14 described further below.

The exhaust system to be assembled at the system assembly station 14 will comprise a muffler 16, a bent exhaust pipe 68, a bent tail pipe 70 and related mounting hardware. The exhaust pipes 68 and the tail pipes 70 are bent into the required configuration at the bending station 12. More particularly, straight pipe sections of appropriate length are delivered to the manufacturing cell depicted in the FIGURE and are appropriately bent at the bending station 12 by one or more programmable benders. The bent exhaust pipe 68 and bent tail pipe 70 are removed from the bending station 12 and placed in storage locations 72 and 74 respectively for subsequent transfer to the system assembly station 14.

The exhaust system assembly station 14 comprises a plurality of mounting fixtures which are indexable through a plurality of different positions. As depicted in the FIGURE, the system assembly station 14 comprises a total of eight positions, but must include fewer than eight indexable fixturing pallets. The exhaust system assembly station 14 comprises a loading position 76 at which a muffler 16, an exhaust pipe 68 and a tail pipe 70 are loaded onto an indexable fixturing pallet along with appropriate mounting hardware. The pallets of the system assembly station 14 then are indexed to advance the loosely assembled but properly positioned components from the loading position to a welding position 78. Robotic welders 80 and 82 are disposed on opposite sides of the indexable fixturing pallet at the welding position 78 and are programmed to perform various specified welding operations on the components in the fixturing pallet at the welding position 78. In particular, the robotic welders 80 and 82 are operative to securely weld the exhaust pipe and tail pipe 68 and 70 to the muffler 16 and to weld the mounting hardware in appropriate dispositions. Additionally, the robotic welders 80 and 82 may be programmed to perform additional welding of the muffler, such as precise welding of the external shells 22 and 24 to the channel portions of the internal plates 18 and 20 adjacent thereto.

The pallet with the exhaust system mounted thereon next advances to positions 84–90. As shown in the FIGURE, there are no manufacturing or assembly operations being carried out at positions 84–90. However, for certain mufflers it will be desirable to complete additional operations at the positions 84–90 For example, some mufflers may have more than one inlet or outlet, and therefore would require a corresponding number of exhaust pipes or tail pipes. In certain of these situations it may be difficult to efficiently weld one pipe to the muffler while the other is in place. Thus, in these situations, a first tail pipe may be fixtured and welded to a muffler, and the second tail pipe may subsequently be fixtured and welded. In still other situations it may be desirable to divide complex and time consuming welding operations between a plurality of different locations such that the time between each indexing is maintained at a minimum. More particularly, it would be desirable to have the initial mounting and fixturing of the muffler 16, exhaust pipe 68 and tail pipe 70 be the control for the index cycle time, rather than the welding.

The final indexing at the station 14 is to position 90 which defines a location where the completed exhaust system 96 is removed from its corresponding pallet. The empty pallet that had been at the unloading position 90 is then indexed to the position 94 for subsequent cycling of the pallet.

In summary, a method and assembly of apparatus are provided for manufacturing mufflers and complete exhaust systems. The assembly of the mufflers is carried out at a muffler assembly station which comprises an indexable fixturing apparatus to which various formed components of the muffler can be mounted. In proximity to the indexable fixturing apparatus are robotic means for delivering partial or complete assemblies of the muffler to welders. As a first step the internal components are welded to one another at a plurality of locations to provide the muffler with adequate internal strength and to ensure vibration free performance. The assembled internal components are then placed between a corresponding pair of external shells and are first advanced to a spot welder and subsequently advanced to a seam welder for securely completing the muffler. Simultaneously, the tubes to define the exhaust pipe and tail pipe of the exhaust system are bent into their required configurations. The bent tubes and the mufflers are delivered to a second indexable fixturing apparatus where the mufflers and pipes are assembled and welded together.

While the invention has been described with respect to a preferred embodiment, it is apparent that various changes can be made without departing from the scope of the invention as defined by the appended claims. For example, the process and apparatus described and claimed may be employed for mufflers having more than or fewer than four components.

We claim:

1. An assembly of apparatus for assembling a plurality of components of a stamp formed muffler, said assembly comprising:
    an indexable fixturing apparatus having at least one first fixture thereon for receiving a first plurality of formed components of said muffler and at least one second fixture thereon for receiving a second plurality of formed components of said muffler, the second plurality of formed components including the components of the first plurality;
    a first connecting apparatus in proximity to said indexable fixturing apparatus;
    a first delivery means for delivering said first plurality of muffler components to said first connecting apparatus for securely connecting said first plurality of components to one another;
    a restrike stamping apparatus for urging selected portions of said second plurality of muffler components into direct fact-to-face contact with one another;
    a second connecting apparatus disposed in proximity to said indexable fixturing apparatus; and
    a second delivery means for delivering said second plurality of muffler components to said restrike stamping apparatus and subsequently to said second connecting apparatus for securing said second plurality of components to one another.

2. An assembly as in claim 1 wherein said first and second connecting apparatus comprise spot welders, and wherein said assembly further comprises a third connecting apparatus for seam welding said second plurality of muffler components to one another about respective peripheries thereof.

3. An assembly as in claim 2 further comprising an indexable gripping apparatus in proximity to said third connecting apparatus, said second delivery means being operative to deliver said muffler from said spot welder to said indexable gripping apparatus, said indexable gripping apparatus being operative to present at least selected portions of the periphery of said muffler to said spot welder.

4. An assembly as in claim 1 wherein the first and second delivery means are first and second programmable robotic grippers for securely gripping the first and second plurality of muffler components and moving said first and second plurality of muffler components to said first and second connecting apparatus respectively.

5. An assembly as in claim 1 further comprising conveyer means in proximity to said first delivery means for conveying the first plurality of muffler components securely connected by said first connecting apparatus to a location for subsequent fixturing to at least one other muffler component to define said second plurality of muffler components.

6. An assembly as in claim 1 wherein said second connecting apparatus is operative to securely connect said second plurality of muffler components to one another at a plurality of discrete spaced apart locations, and wherein said assembly comprises a third connecting apparatus for defining an interconnected seam about the periphery of said second plurality of muffler components, said second delivery means being operative to deliver said second plurality of muffler components from said second connecting apparatus to said third connecting apparatus.

7. An assembly as in claim 2 wherein the restrike stamping apparatus is operative to exert a stamping force of at least approximately 100 tons.

8. Apparatus for assembling a plurality of stamp formed components to define a stamp formed muffler, said apparatus comprising:

fixturing means for aligning said components such that selected portions of each said component are in generally abutting relationship to at least one other of said components;

a first attachment means for attaching at least one location of each said component to at least one other location of a component in generally abutting relationship thereto;

a stamping press for applying a stamping force to the selected portions of said components and urging at least one other location of each said component into direct abutting face-to-face relationship with at least one location of another of said components;

a second attachment means for attaching the portions of said components urged into direct abutting face-to-face relationship with one another.

9. Apparatus as in claim 8 further comprising gripping means for securely gripping said components and selectively delivering the gripped components from the fixturing means to the first and second attachment means.

10. Apparatus as in claim 8 wherein the first attachment means comprises a welding apparatus.

11. Apparatus as in claim 8 wherein the second attachment means comprises a welding apparatus.

12. Apparatus as in claim 8 wherein each said component comprises a peripheral region, said stamping press each said component into direct abutting face-to-face relationship with another of sadi components comprises means for urging the peripheral regions of said components into direct abutting face-to-face contact with one another.

13. Apparatus as in claim 8 wherein the fixturing means comprises an indexable fixturing means having a plurality of indexable fixtures thereon selectively movable from a first position to at least a second position and back to the first position, said first and second attachment means being in proximity to the indexable fixturing means, said assembly further comprising robotic gripping means for selectively moving the fixtured components from the indexable fixturing means to the first and second attachment means.

14. Apparatus as in claim 8 further comprising a second indexable fixturing means for receiving the components attached by the second attachment means, said assembly further comprising means for attaching at least one additional component to the assembled components in the second fixturing means.

* * * * *